United States Patent
Hancock-Cooke et al.

(10) Patent No.: US 7,721,887 B2
(45) Date of Patent: May 25, 2010

(54) PACKAGE FOR CONSUMABLE PRODUCTS WITH SEPARATELY SEALED COMPARTMENTS

(75) Inventors: Catherine Marguerite Hancock-Cooke, Neenah, WI (US); Jane L. Clough, Neenah, WI (US); Timothy James Blenke, Neenah, WI (US); Patrick Sean McNichols, Hortonville, WI (US); Meewha Lee, Appleton, WI (US); Pam Thompson, Greenville, WI (US); Jennifer L. Marvin, Everett, WA (US); Thomas Tanakon Ungpiyakul, Neenah, WI (US); Sheng-Hsin Hu, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1195 days.

(21) Appl. No.: 11/300,746

(22) Filed: Dec. 15, 2005

(65) Prior Publication Data
US 2007/0141283 A1 Jun. 21, 2007

(51) Int. Cl.
*B65D 85/00* (2006.01)
*B65D 73/00* (2006.01)
*B66C 1/10* (2006.01)

(52) U.S. Cl. .................. 206/391; 206/494; 206/497; 294/87.2

(58) Field of Classification Search ................ 428/35.7; 206/391, 432, 497, 139, 294, 199, 443, 427, 206/494; 294/87.2
See application file for complete search history.

(56) References Cited

U.S. PATENT DOCUMENTS

| | | | |
|---|---|---|---|
| 761,783 | A | 7/1904 | Prudhomme |
| 2,111,621 | A | 3/1938 | Gerking et al. |
| 2,299,625 | A | 10/1942 | Holmes |
| 2,644,631 | A | 7/1953 | Petter |
| 2,646,911 | A | 7/1953 | Holmberg |
| 2,677,460 | A | 5/1954 | Johnson et al. |
| 2,680,039 | A | 6/1954 | Burge |
| 2,737,326 | A | 3/1956 | Toensmeier |
| 2,813,602 | A | 11/1957 | MacArthur, Jr. |
| 2,849,110 | A | 8/1958 | Weiss |

(Continued)

FOREIGN PATENT DOCUMENTS

EP 1352601 A2 10/2003

(Continued)

OTHER PUBLICATIONS

U.S. Appl. No. 11/303,043, filed Dec. 15, 2005, Nukuto et al., Carrier for Consumable Products.

(Continued)

*Primary Examiner*—Thao T. Tran
(74) *Attorney, Agent, or Firm*—Dority & Manning, P.A.

(57) ABSTRACT

A package for consumable products is disclosed. The package includes a plurality of subpackages connected together by a connecting member. For instance, the package may contain two subpackages or alternatively four subpackages all connected at one end to a connecting member. The package is particularly well suited to holding relatively large quantities of the consumable product. Because the subpackages are connected at one end, the package may be draped over an adjacent structure, such as a shopping cart. In this way, the package can be placed in a shopping cart without taking up an excessive amount of space.

25 Claims, 7 Drawing Sheets

U.S. PATENT DOCUMENTS

| | | |
|---|---|---|
| 2,931,491 A | 4/1960 | Taylor |
| 3,125,145 A | 3/1964 | Williams |
| 3,217,874 A | 11/1965 | Potter |
| 3,224,575 A | 12/1965 | Whiteford |
| 3,240,420 A | 3/1966 | Membrino |
| 3,268,070 A | 8/1966 | Cunningham |
| 3,277,628 A | 10/1966 | Harrison |
| 3,300,041 A | 1/1967 | Fuller |
| 3,307,321 A | 3/1967 | Beart |
| 3,360,179 A | 12/1967 | Carstens |
| 3,369,655 A | 2/1968 | Harrison |
| 3,460,671 A | 8/1969 | Harm |
| 3,515,272 A | 6/1970 | Von Gal |
| 3,734,278 A | 5/1973 | Kerrigan et al. |
| 3,752,305 A | 8/1973 | Heyne |
| 3,822,012 A | 7/1974 | Weaver |
| 3,885,667 A | 5/1975 | Spiegel et al. |
| 3,924,739 A | 12/1975 | Gravesteijn |
| 4,050,216 A | 9/1977 | Stenberg |
| 4,269,308 A | 5/1981 | Platt |
| 4,289,236 A | 9/1981 | Ganz |
| 4,385,690 A | 5/1983 | Olsen |
| 4,441,611 A | 4/1984 | Sommariva |
| 4,518,081 A | 5/1985 | de Larosiere |
| 4,765,474 A | 8/1988 | James |
| 4,779,731 A | 10/1988 | Fujio |
| 4,865,208 A | 9/1989 | Lax et al. |
| 5,048,687 A | 9/1991 | Suzuki et al. |
| 5,154,288 A | 10/1992 | Glöyer |
| 5,299,733 A | 4/1994 | Werth |
| 5,353,900 A | 10/1994 | Stilley |
| 5,361,905 A | 11/1994 | McQueeny et al. |
| 5,400,494 A | 3/1995 | Stilley |
| 5,452,798 A | 9/1995 | Kraft |
| 5,685,428 A | 11/1997 | Herbers et al. |
| D391,399 S * | 3/1998 | Mills ........................... D4/108 |
| 5,938,336 A * | 8/1999 | King .............................. 383/4 |
| 6,021,890 A | 2/2000 | Focke et al. |
| 6,293,392 B1 | 9/2001 | Galbierz |
| 6,397,860 B1 * | 6/2002 | Hill, II ....................... 132/309 |
| 6,409,385 B1 | 6/2002 | Gee |
| 6,513,657 B2 | 2/2003 | Sheehan, Jr. |
| 6,578,724 B1 | 6/2003 | Owens |
| 6,779,655 B2 | 8/2004 | Olsen et al. |
| 6,834,762 B2 | 12/2004 | Krisko et al. |
| 6,957,914 B2 | 10/2005 | Arends et al. |
| 7,014,062 B2 | 3/2006 | Parris et al. |
| 7,621,397 B2 * | 11/2009 | Boudrie et al. .............. 206/391 |
| 2003/0029752 A1 | 2/2003 | Terrell |
| 2004/0043167 A1 | 3/2004 | Holzem et al. |
| 2004/0055907 A1 | 3/2004 | Marco |
| 2005/0050857 A1 | 3/2005 | Ono et al. |
| 2005/0194413 A1 | 9/2005 | Baker |

FOREIGN PATENT DOCUMENTS

| | | |
|---|---|---|
| EP | 1352601 A3 | 10/2003 |
| WO | WO 03080440 A1 | 10/2003 |
| WO | WO 03105622 A1 | 12/2003 |

OTHER PUBLICATIONS

U.S. Appl. No. 11/303,006, filed Dec. 15, 2005, Boudrie et al., Packaging Configurations for Consumable Products.

* cited by examiner

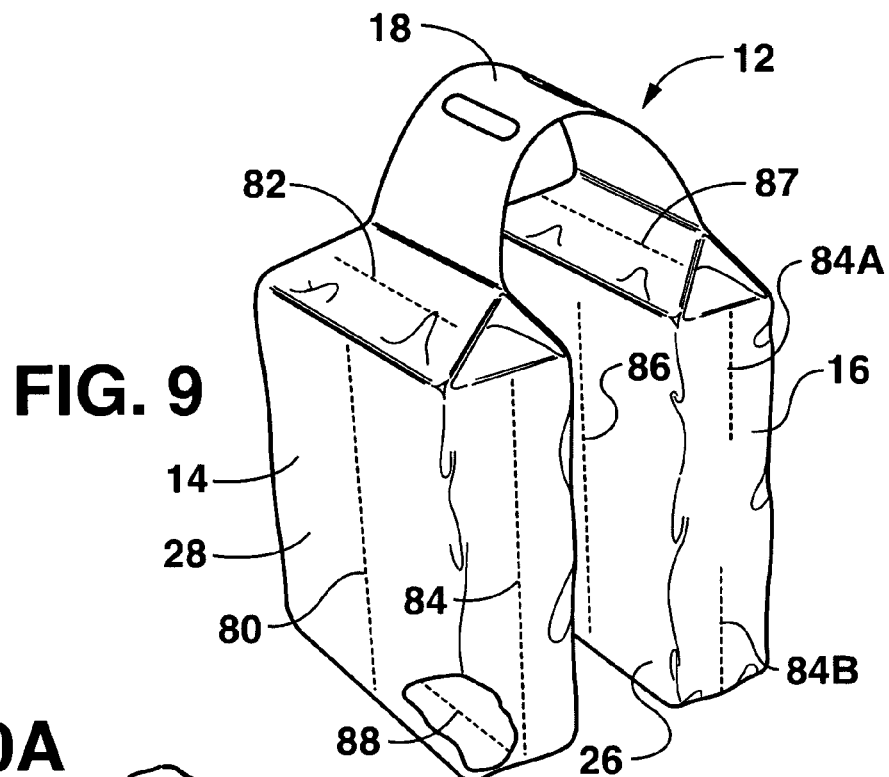
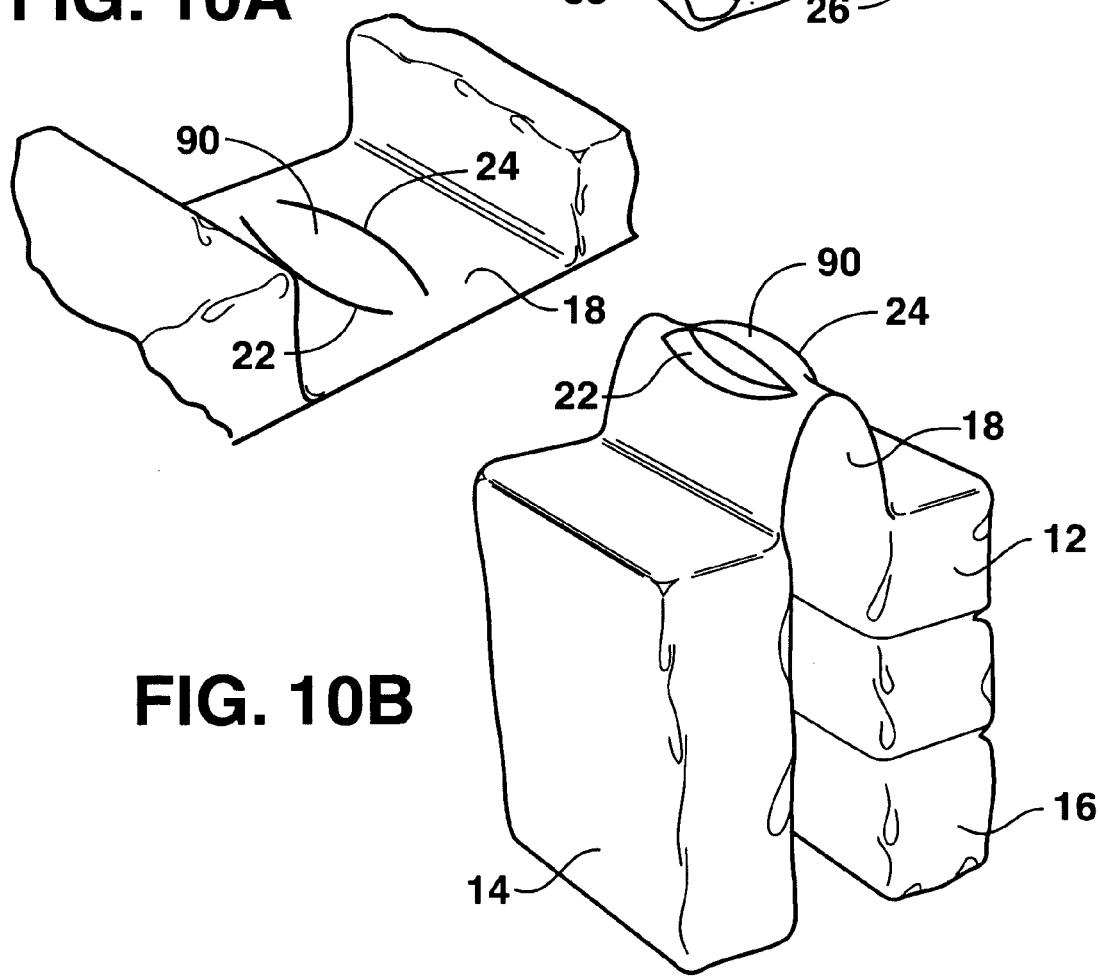

PACKAGE FOR CONSUMABLE PRODUCTS WITH SEPARATELY SEALED COMPARTMENTS

BACKGROUND OF THE INVENTION

Many consumable products, such as paper towels, bath tissue, diapers and related products, adult incontinence products, child training pants, feminine hygiene products, and the like are sometimes packaged and sold in relatively large quantities. There are many advantages to consumers for purchasing these types of products in greater amounts. For instance, these types of products are typically consumed rather quickly and having greater amounts reduces the need to return to the store. Another advantage to consumers when buying in relatively large quantities is that the price per unit is typically less than when buying in smaller quantities.

There are also various advantages to manufacturers in the ability to sell their products to consumers in relatively large quantities. In particular, there may be some cost and processing efficiencies in packaging the products into larger packages. Shipping and handling costs may also be reduced.

When sold in bulk, consumable products are typically packaged in large rectangular plastic film bags or are sold in cardboard boxes. Due to the size of these packages, however, the packages can be somewhat difficult for consumers to carry and hold. Also, such large packages can take up great amounts of space in shopping carts limiting the space in the cart for other products. As such, a need currently exists for an improved packaging design for packaging relatively large quantities of consumable products. In particular, a need exists for a bulk-type package for consumable products that is easy for consumers to carry and handle.

SUMMARY OF THE INVENTION

In general, the present disclosure is directed to various packaging configurations for consumable products. The packages are well suited to packaging relatively large quantities of one or more consumable products, although the packages may also work equally well with smaller quantities. In general, the packages include a plurality of separate lobes or subpackages for holding one or more consumable products. A handle may be placed where the subpackages are held together. In this manner, packages can not only hold great quantities of products but are easy to carry and handle.

In one particular embodiment, for instance, the present disclosure is directed to a packaged consumable product comprising an outer package that includes a first subpackage spaced from a second subpackage. The first subpackage is attached to the second subpackage by a connecting member. The connecting member has a width and is made from a material sufficient to permit the first subpackage to fold adjacent to the second subpackage.

A first group of consumable products is contained in the first subpackage and a second group of consumable products is contained in the second subpackage. In addition, the outer package includes a handle for carrying and transporting the packaged product.

In general, the first subpackage may have substantially the same volume as the second subpackage. For instance, the volume of the first subpackage may be within about 20%, such as within about 10%, such as within about 5% of the volume of the second subpackage. Alternatively, when filled with a consumable product, the weight of the first subpackage may be within about 20%, such as about 10%, such as about 5% of the weight of the second subpackage.

The outer package can be made from any suitable material. In one embodiment, for instance, the outer package may be made from a plastic film, a nonwoven web, a coated paper, or mixtures thereof. When using a plastic film, the plastic film may be made from a single polymer layer or may be made from multiple layers of different polymers.

In general, any suitable consumable product may be packaged within the outer package as described above. The consumable products contained in the outer package may comprise, for instance, diapers, training pants, swimming pants, tissue products, adult incontinence products, feminine hygiene products and the like. Each subpackage may contain the same product or may contain different products.

The handle associated with the package can have many different types of configurations. In one embodiment, for instance, the handle may be integral with the connecting member. For instance, the connecting member may comprise a first opening spaced from a second opening. The first and second openings may cooperate together to form the handle when the first subpackage is folded adjacent to the second subpackage.

Alternatively, the handle may comprise a panel attached to the connecting member that extends in a generally perpendicular direction from the connecting member. The handle may define an opening for receiving the hand of a user.

In still another embodiment, the connecting member comprises a foam substrate that has been laminated to either a film or a textile material. For instance, in one embodiment, the foam may be laminated to a nonwoven material, such as a meltblown web. The foam may define two openings spaced from a fold line. The two openings may cooperate together to form the handle when the foam is folded along the fold lines. Each end of the foam connecting member may be attached to the first and second subpackages in order to form the outer package. For instance, each end of the foam material may be connected to the first and second subpackages through thermal bonding, adhesive bonding, ultrasonic bonding, or the like.

In still another embodiment of the present invention, the handle may comprise a band that is connected at each end to the connecting member. In this manner, the band forms a handle that can be grasped by a user.

In order to open the outer package, the outer package may include one or more perforation lines that are designed to be broken open by the user for removing the contents of the package. For example, the outer package includes an exterior surface that defines an inner surface portion and an outer surface portion. The inner surface portion is located between the first and second subpackages when the subpackages are placed adjacent to one another. In one embodiment, vertical perforation lines may be located on the inner surface portion of each subpackage for later opening the package. Alternatively, the perforation line may be horizontal or may comprise a combination of vertical and horizontal lines. Alternatively, vertical and/or horizontal perforation lines may be located on the outer surface portion of the outer package.

In still another embodiment of the present disclosure, each of the subpackages may further include subcompartments. For instance, in one embodiment, the consumable products contained within the package comprise spirally wound tissue products, such as bath tissue or paper towels. The spirally wound products may form columns that comprise one or more of the products stacked together. The subpackages may include subcompartments containing a column of the spirally wound product. Further, each of the subcompartments may be separated by perforation lines for removing one column of product from the package at a time as the product is used by the consumer.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 9 is a perspective view of still another embodiment of a package made in accordance with the present disclosure; and FIGS. 10A and 10B are perspective views of another embodiment of a package made in accordance with the present disclosure.

Figure 1:
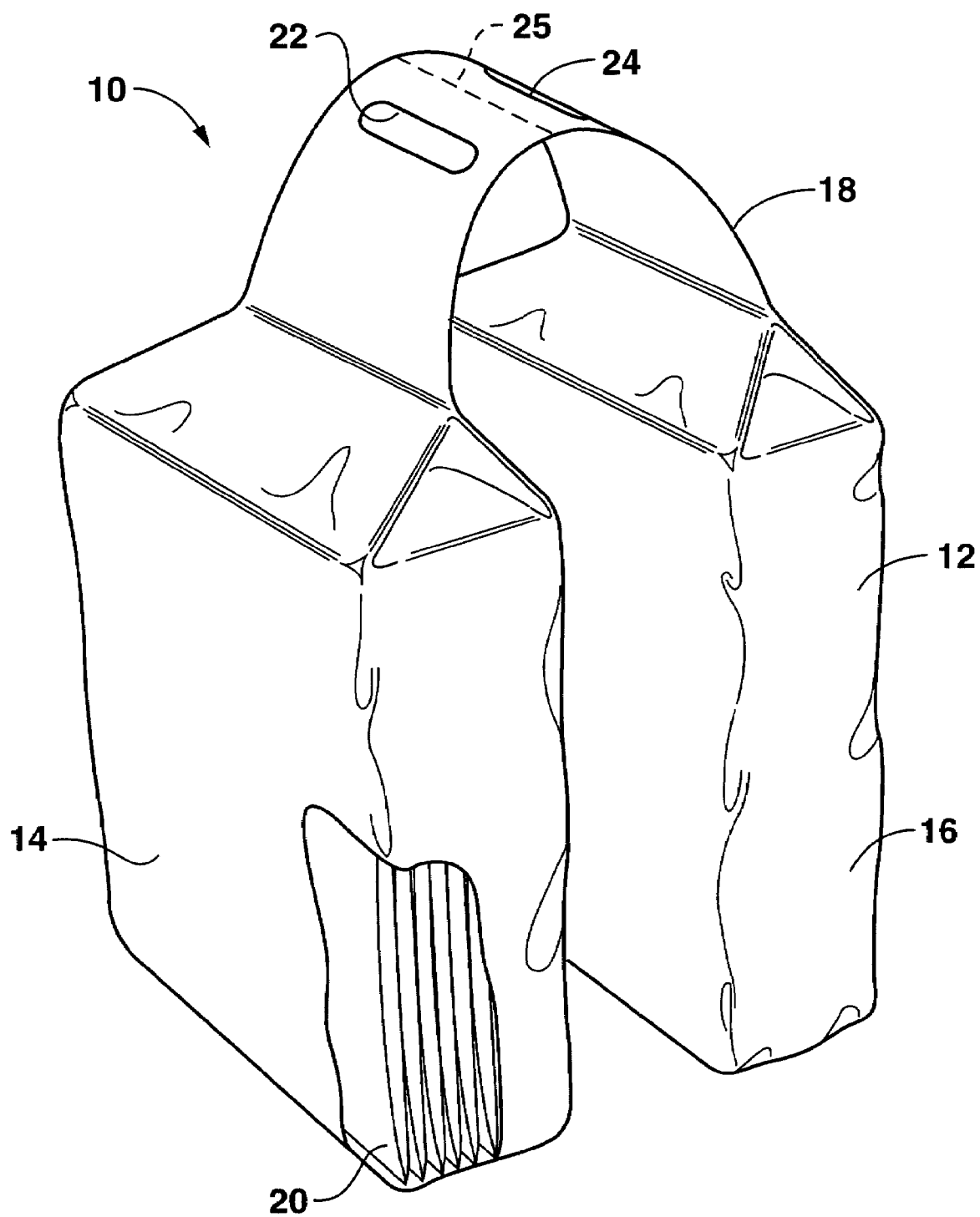
FIG. 1 is a perspective view with cutaway portions of one embodiment of a package for consumable products made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

In general, the present disclosure is directed to a package for consumable products. In particular, the package is well suited to holding relatively large amounts of a consumable product while still being easy to handle and hold. The package of the present disclosure not only facilitates the ability of consumers to purchase consumable products in large bulk, but also provides a package and shipping solution to manufacturers without substantially increasing the cost of the product.

The package of the present disclosure generally includes a handle connected to a plurality of lobes or subpackages. For instance, the handle may form a bridge between two subpackages or between two pair of subpackages. Each subpackage can contain approximately the same amount of a consumable product or one subpackage may contain a first consumable product while the second subpackage may contain a different consumable product. In one embodiment, the subpackages may only be connected at one end and may generally weigh about the same once filled with a consumable product. In this manner, the subpackages may be draped over an adjacent structure, such as the edge of a shopping cart, for easily transporting the packages while minimizing the amount of space the packages take up in the cart. The ends at which the subpackages are joined can also include a handle for easily grasping, moving and picking up the package.

Referring to FIG. 1, for instance, one embodiment of a packaged consumable product generally 10 made in accordance with the present disclosure is shown. As illustrated, the product 10 includes an outer package 12 that comprises a first subpackage 14 and a second subpackage 16. The first subpackage 14 and the second subpackage 16 are connected together by a connecting member 18 at one end of each of the subpackages. The connecting member 18 may be integral with the packaging material as shown in FIG. 1, or may be attached to the top of each subpackage using any suitable means, such as by using an adhesive or through thermal or ultrasonic bonding.

Each subpackage contains a consumable product 20. The consumable product 20 may comprise, for instance, diapers. It should be understood, however, that nearly any consumable product may be contained within the outer package 12. For instance, the outer package may also contain tissue products, such as paper towels, bath tissue, or facial tissue. Alternatively, the package may contain feminine hygiene products, training pants, adult incontinence products, and the like. In still other embodiments, the package may contain auxiliary baby products such as wet wipes, disposable placemats, and other similar items.

Each of the subpackages 14 and 16 may contain the same consumable product or may contain different products. Further, each subpackage may contain a mix of products if desired.

In one embodiment, once filled with one or more consumable products, the subpackages 14 and 16 have substantially the same weight so as to provide a balanced overall package. For instance, the weight of the first subpackage 14 may be within about 20%, such as within about 10%, such as within about 5% of the weight of the second subpackage 16. Similarly, the volume of each subpackage may be substantially the same depending upon the consumable products being packaged. For instance, the volume of the first subpackage 14 may be within about 20%, such as within about 10%, such as within about 5% of the volume of the second subpackage 16.

The outer package 12 may be made from any suitable material. For instance, in one embodiment, the outer package 12 is made from a flexible material, such as a polymer film, a coated paper, or a textile material. The textile material may comprise, for instance, one or more nonwoven webs. For instance, the outer package may be made from a meltblown web or may be made from a laminate comprising spunbond webs, meltblown webs, and mixtures thereof.

In order to carry the packaged product 10, the outer package 12 may include a handle. For example, in one embodiment, the handle may be integral with the connecting member 18. For instance, as shown in FIG. 1, the connecting member 18 defines a first opening 22 and a second opening 24. The openings 22 and 24 may be configured to receive the fingers and thumb of a hand for picking up and grasping the package.

Figure 3A:
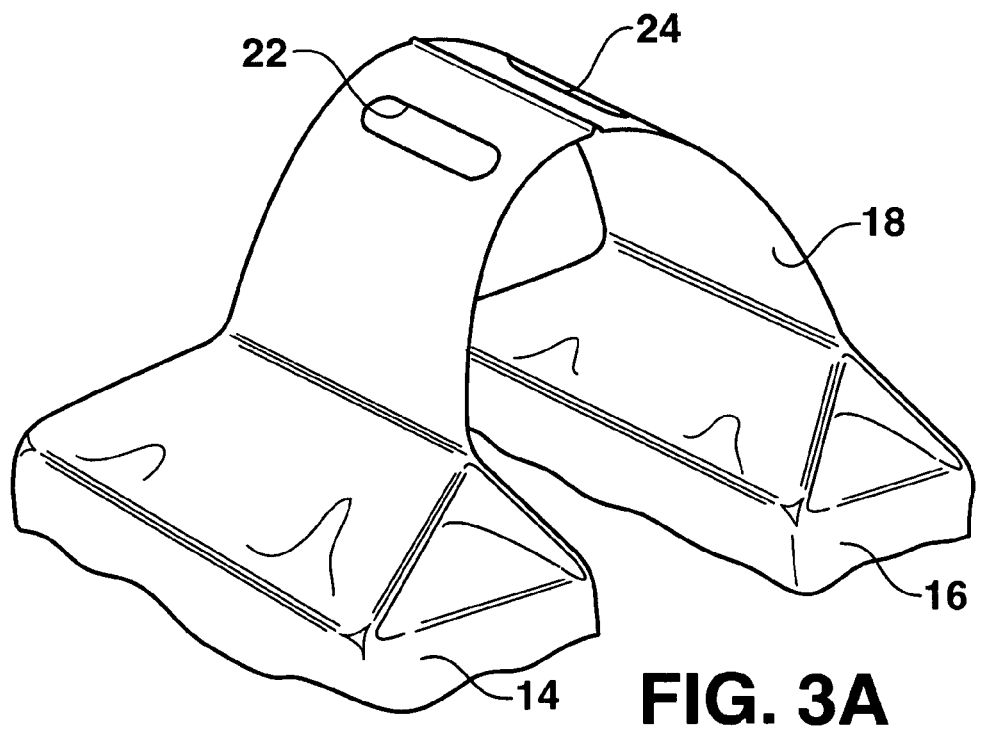
FIGS. 3A and 3B are perspective views of the handle on the package as shown in FIG. 1.
Figure 3B:
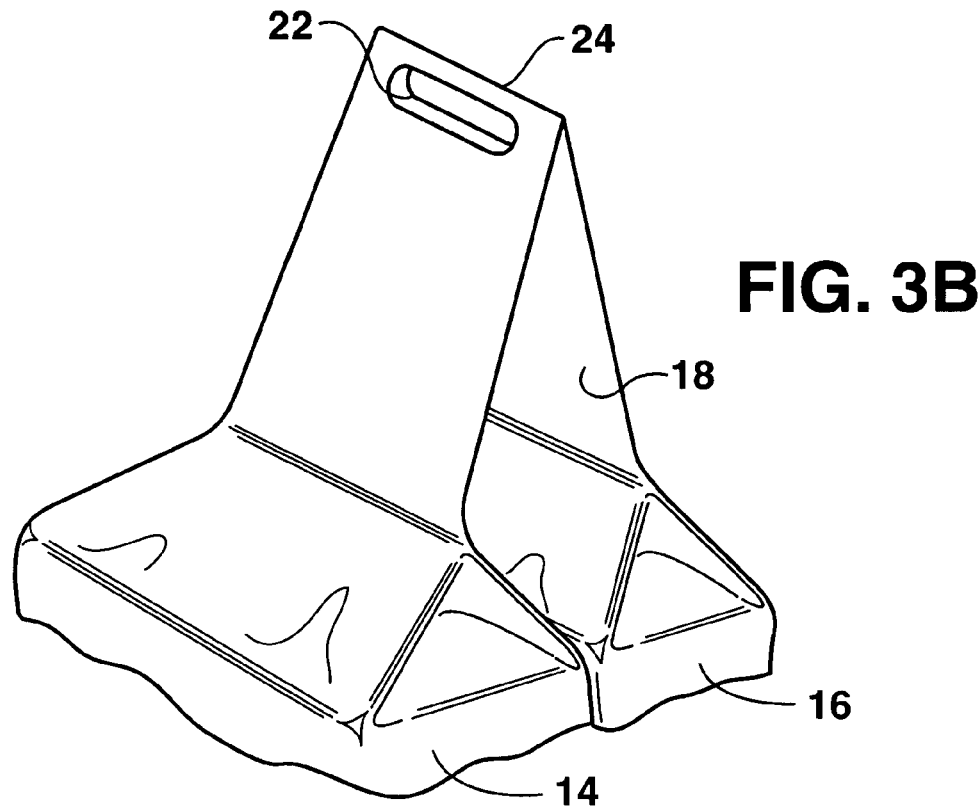

Referring to FIGS. 3A and 3B, one manner in which the openings 22 and 24 may form a handle is shown. For instance, as shown in FIGS. 3A and 3B, as the subpackages 14 and 16 are placed adjacent to one another, the connecting member 18 may fold along a line that is equidistant from the first opening 22 and the second opening 24. In this manner, as particularly shown in FIG. 3B, the openings 22 and 24 cooperate with each other to form a handle for receiving the hand of a user.

Referring back to FIG. 1, in one embodiment, the connecting member may define at least one perforation line 25. The perforation line 25 is for separating the first subpackage 14 from the second subpackage 16. In this manner, after the package is purchased, a consumer can store the consumable products at different locations.

Figure 2:
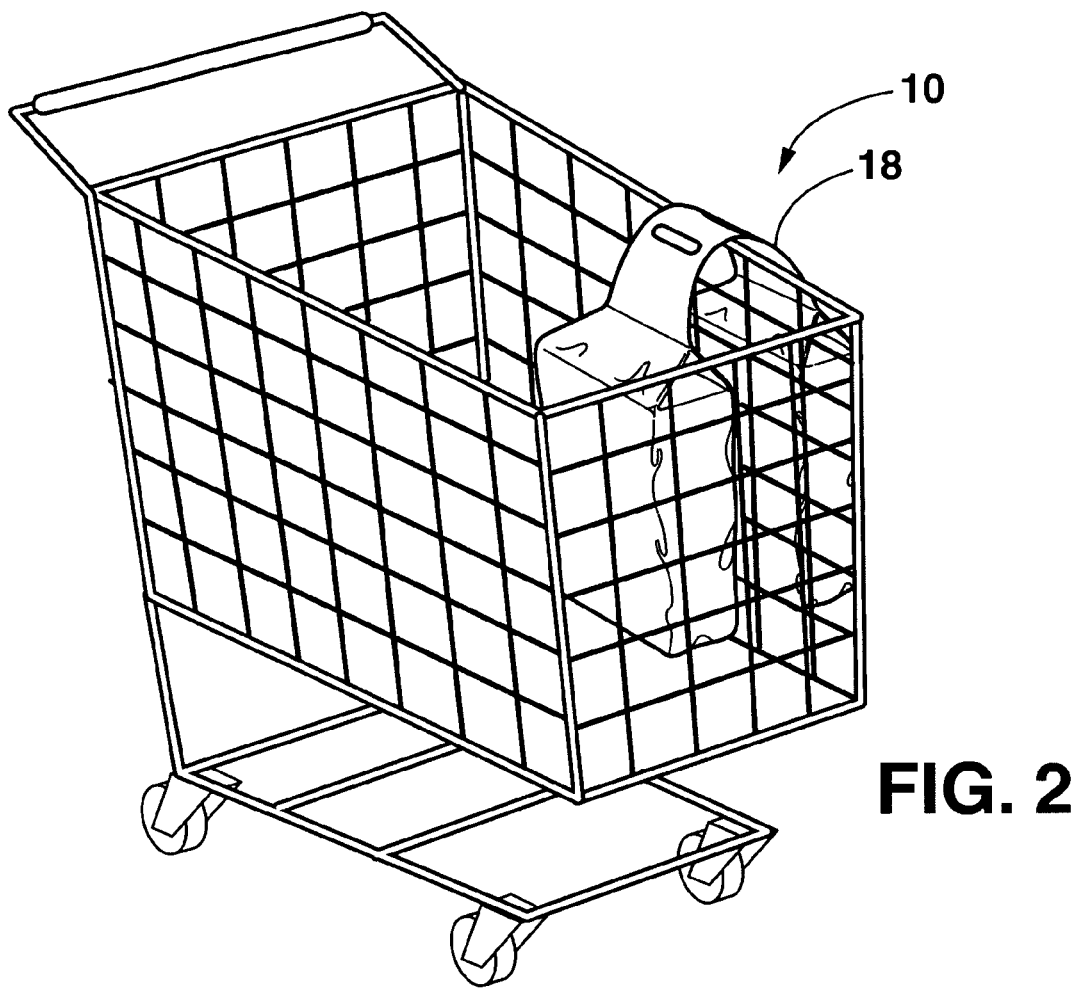
FIG. 2 is a perspective view illustrating the package shown in FIG. 1 placed in a grocery cart.

The package 12 as illustrated in FIG. 1 is well suited to holding relatively large amounts of a consumable product. The products are contained within the two subpackages in a manner that creates balance with respect to the connecting member 18 and the handle formed by the openings 22 and 24. The package 12 as shown in FIG. 1 is much easier to handle than simply a large rectangular package, such as a cardboard box. In addition, the package can also provide various other benefits and advantages. For instance, as shown in FIG. 2, each of the subpackages may be draped over the wall of a grocery cart for transporting the package through a retail store. In this manner, the consumable product only takes up one half the space in the grocery cart in comparison to if the consumable product was contained all in a single rectangular package. Further, the package can be printed or otherwise display the manufacturer's product name and logo. In this manner, the manufacturer of the consumable product gains a benefit by having the package displayed on the grocery cart as the cart is moved through the store.

In addition to the railing of a grocery cart, the subpackages may be draped over various other adjacent structures and objects. For example, the package may be draped over the bar on a bicycle if desired. The subpackages may also be draped over a person's arm or shoulder in order to carry and transport the package, especially when attempting to carry other items as well.

Figure 4:
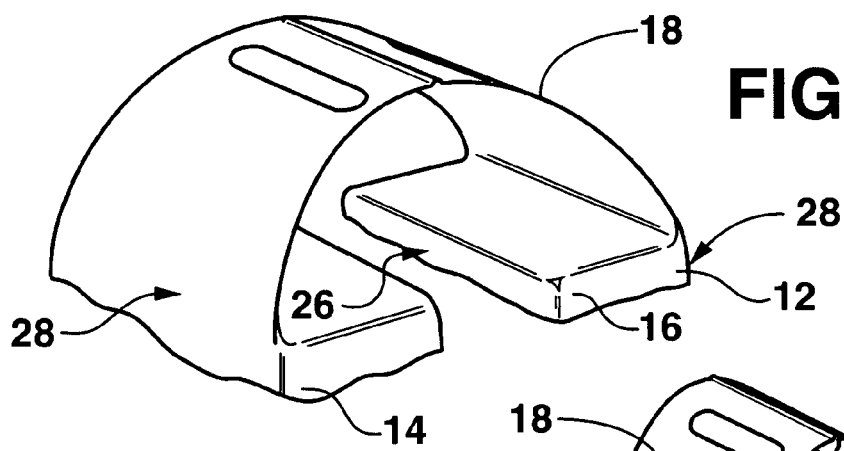
FIG. 4 is an alternative embodiment of a package made in accordance with the present disclosure.

In the embodiment shown in FIG. 1, each end of each subpackage forms a triangular shape that is then attached to the connecting member 18. The connecting member 18, however, may be incorporated into the package in other manners. For instance, as shown in FIG. 4, the outer package 12 includes an exterior surface that defines an inner surface portion 26 that is located where the first and second subpackages lay adjacent to one another. The exterior surface of the outer package 12 further includes an outer surface portion 28 that is opposite the inner surface portion. As shown in FIG. 4, in one embodiment, the connecting member 18 may extend from the outer surface portion 28 of each of the subpackages 14 and 16. In this manner, if desired, the connecting member 18 may be integral with the material that is used to form the outer surface portion 28.

Figure 5:
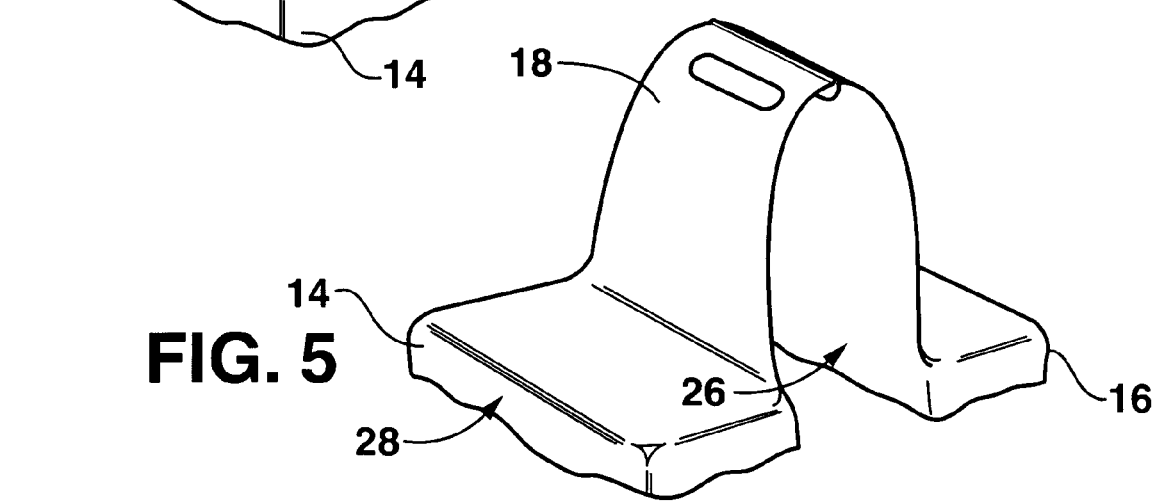
FIG. 5 is a perspective view of still another embodiment of a package made in accordance with the present disclosure.

Alternatively, as shown in FIG. 5, the connecting member 18 may be attached to the inner surface portion 26 of each of the subpackages 14 and 16. Again, if desired, the connecting member 18 may be integral with the material used to form the inner surface portions.

Figure 6A:
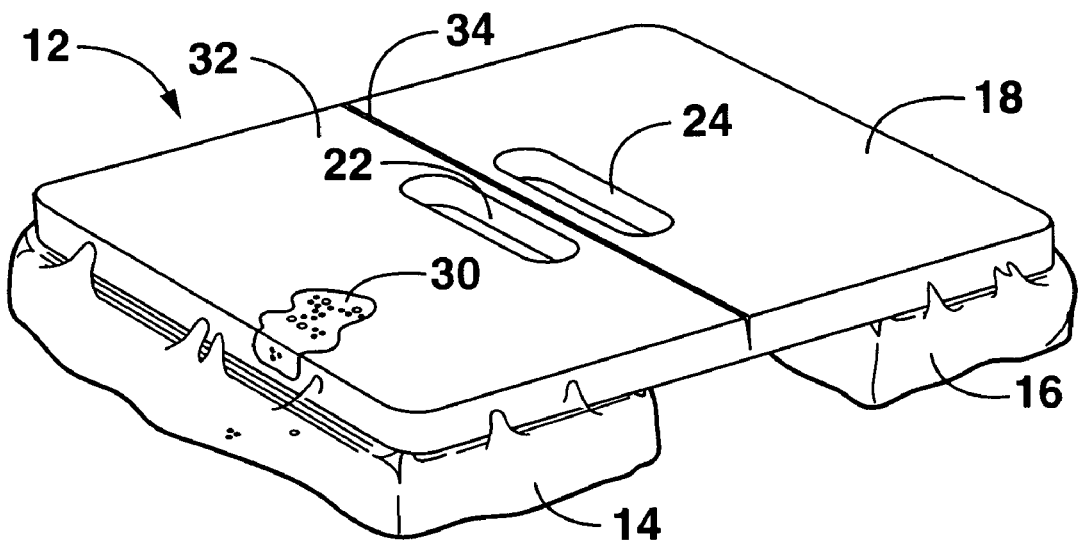
FIGS. 6A and 6B are perspective views of still another embodiment of a package made in accordance with the present disclosure.
Figure 6B:
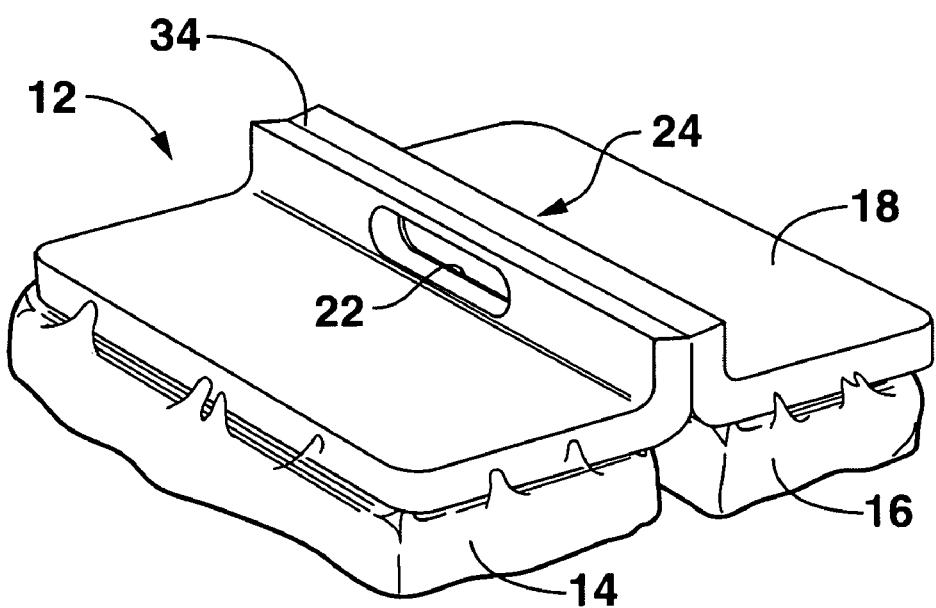

Referring to FIGS. 6A and 6B, another embodiment of an outer package made in accordance with the present disclosure is shown. Like reference numerals have been used to indicate the same or similar elements. As shown, in this embodiment, the outer package 12 includes a first subpackage 14 connected to a second subpackage 16 by a connecting member 18. In this embodiment, the connecting member 18 is at least partially formed from a rigid material, such as a foam material 30. The foam material may comprise, for instance, any suitable open cell or closed cell foam, such as a polystyrene foam or a urethane foam.

In addition to a foam material, it should be understood that the connecting member in this embodiment can also be made from various other rigid materials. As used herein, a rigid material refers to a material capable of being self supporting and maintaining its' shape under a load, such as the load of the package. Rigid materials as used herein are opposite to flexible materials which refer to materials that may easily deform in shape, such as a polymer film. Other rigid materials that may be used to form the connecting member 18 as shown in FIGS. 6A and 6B include rigid polymeric panels made from any suitable thermoplastic polymer or a paperboard material, such as cardboard.

If desired, as shown in FIG. 6A, the rigid substrate or foam material 30 may be covered by a film material or a textile material 32. The outer covering 32, for instance, may comprise a polymer film or may comprise a woven, a knitted or a nonwoven material. In one particular embodiment, for instance, the foam substrate 30 is covered by a meltblown web or a spunbond web.

In the embodiment illustrated in FIGS. 6A and 6B, the connecting member 18 may be integral with the material used to form the subpackages 14 and 16. Alternatively, the connecting member 18 may be attached to the subpackages using any suitable technique. For instance, the connecting member may be attached to the subpackages by using an adhesive, through thermal bonding, through ultrasonic bonding, or through a mixture of both. In still another embodiment, the connecting member 18 may be stitched to the subpackages 14 and 16. By covering the foam material 30 with a nonwoven web, such as a meltblown web, the meltblown web allows for attachment of the connecting member 18 to the subpackages via thermal or ultrasonic bonding.

The connecting member 18 as shown in FIGS. 6A and 6B may include a pair of openings 22 and 24 for serving as a handle. If desired, the connecting member 18 may include a score line 34 that allows the connecting member 18 to fold. For instance, as shown in FIG. 6B, when the subpackages 14 and 16 are placed adjacent to one another, the first opening 22 cooperates with the second opening 24 to form a handle along the fold line 34.

Figure 7:
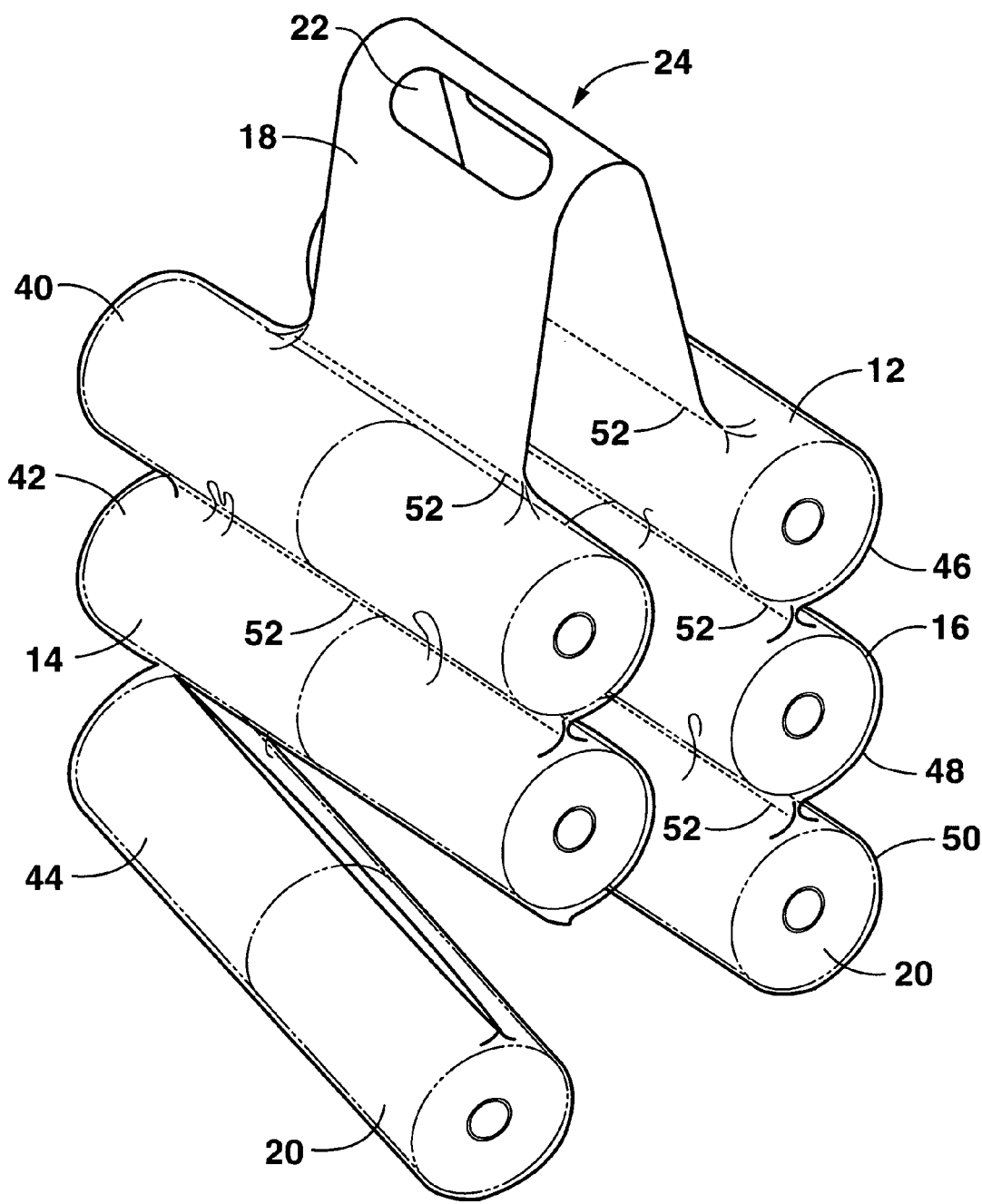
FIG. 7 is a perspective view of still another embodiment of a package made in accordance with the present disclosure.

Referring to FIG. 7, still another embodiment of a package for consumable products made in accordance with the present disclosure is shown. Again, like reference numerals are used to indicate the same or similar elements.

In this embodiment, the outer package 12 includes a first subpackage 14 connected to a second subpackage 16 by a connecting member 18. Integral with the connecting member 18 are a pair of openings 22 and 24 which serve as a handle. In this embodiment, the package 12 contains spirally wound tissue products 20 that may comprise, for instance, either paper towels or bath tissues. The spirally wound products 20 are arranged in columns. Each column may contain one or a plurality of products. In the embodiment shown in FIG. 7, for instance, each column contains two products. In accordance with this embodiment, each subpackage is further divided into subcompartments that each contain a column of the spirally wound product 20.

For instance, subpackage 14 includes three subcompartments 40, 42 and 44. Similarly, subpackage 16 contains three subcompartments 46, 48 and 50. In this embodiment, each subcompartment is separated from the other subcompartments by a perforation line 52. In this manner, a consumer can detach one of the subcompartments from the package during use of the product. In this manner, most of the product can remain protected in the package until actually needed by the consumer. It should be understood, however, that the package 12 as shown in FIG. 7 can contain any suitable consumable product and is not limited for use with spirally wound products.

Figure 8A:
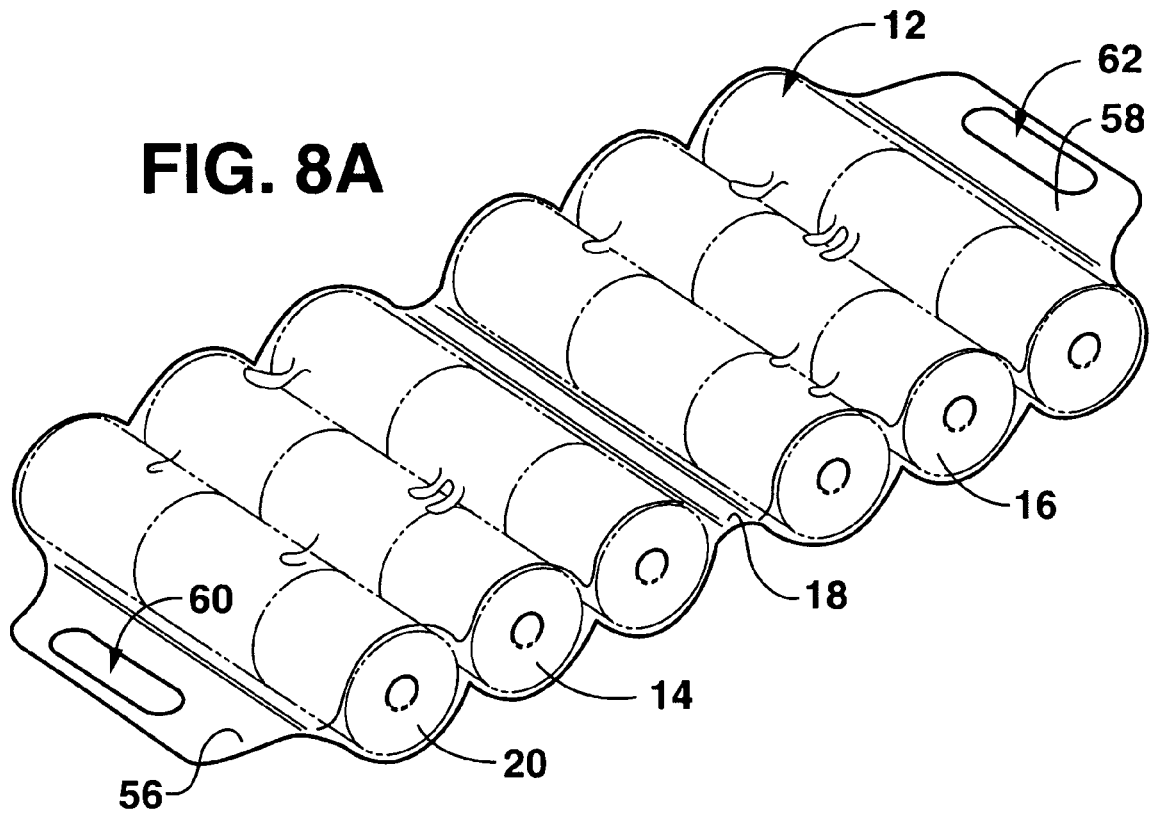
FIGS. 8A and 8B are perspective views of another embodiment of a package made in accordance with the present disclosure.
Figure 8B:
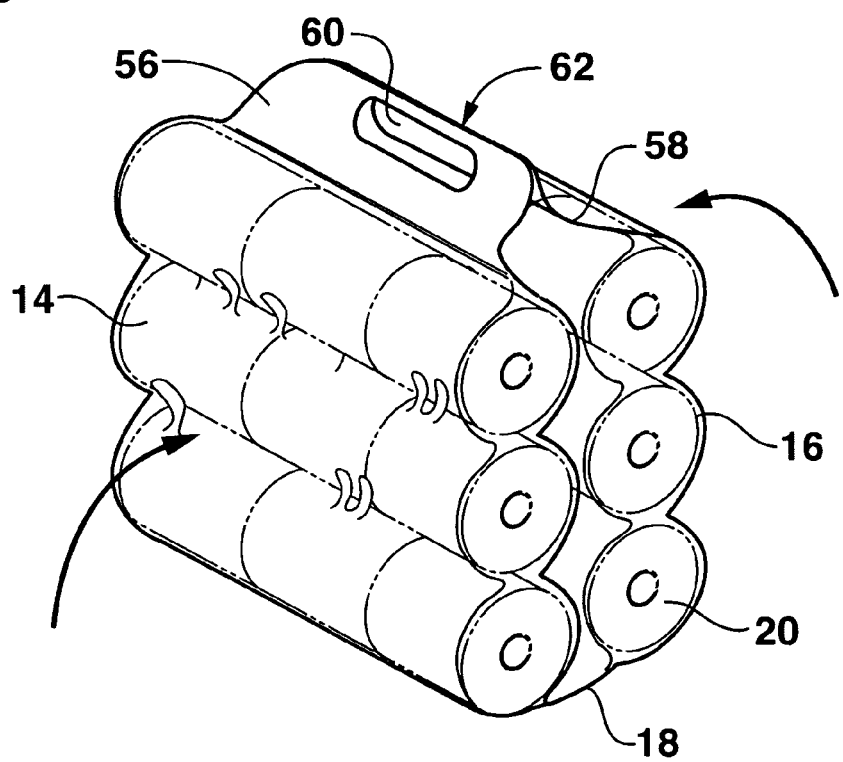

Referring to FIGS. 8A and 8B, still another embodiment of a package 12 made in accordance with the present disclosure is shown. The package as illustrated in FIGS. 8A and 8B is similar in construction to the package 12 as shown in FIG. 7. In particular, the package 12 includes a first subpackage 14 connected to a second subpackage 16 by a connecting member 18. Similar to FIG. 7, the package 12 contains spirally wound products 20 packaged in columns.

In the embodiment shown in FIGS. 8A and 8B, however, the handle for carrying the package is not integral or connected to the connecting member 18. Instead, the package 12 includes a first end panel 56 attached to the first subpackage 14 and a second end panel 58 attached to the second subpackage 16. The first end panel 56 defines an opening 60, while the second end panel 58 defines an opening 62. As shown in FIG. 8B, when the first subpackage is folded adjacent to the second subpackage, the end panels 56 and 58 meet to form a handle. In particular, the opening 60 cooperates with the opening 62 to define a passage that is configured to receive a hand for carrying the package. If desired, each end panel 56 and 58 may include some type of engagement mechanism for attaching the two end panels together to form a consolidated package. For instance, the two end panels 56 and 58 may be attached together using adhesive, by using hook and loop fasteners, or by using any suitable mechanical fastener.

Referring to FIG. 9, another embodiment of a package 12 made in accordance with the present disclosure is shown. Like reference numerals have been used to indicate the same or similar elements. The embodiment illustrated in FIG. 9 is similar to the embodiment illustrated in FIG. 1. The package 12 includes a first subpackage 14 spaced from a second subpackage 16. A connecting member 18 connects the first subpackage 14 to the second subpackage 16.

As shown, the package 12 includes an exterior surface defining an inner surface portion 26 positioned adjacent the subpackages 14 and 16 and an outer surface portion 28. In this embodiment, in order to open the package, the package includes a plurality of perforation lines that are designed to be broken open by the consumer. For instance, in one embodiment, the subpackages may include vertical perforation lines 80 and/or 84 on the outer surface portion 28 of the package. Alternatively, or in addition to the vertical perforation lines, the package may include horizontal perforation lines 82 also on the outer surface portion of the package.

In one embodiment, the perforation lines may be located on the inner surface portion 26 of the package. By being located on the inner surface portion 26, the perforation lines may be protected against accidental rupture. For instance, the package may include vertical perforation lines 86 on the inner surface portion or may include horizontal perforation lines 87. The horizontal perforation line 87 as shown in FIG. 9 may be a particularly desirable location. For instance, the perforation line 87 is adjacent to the connecting member 18 and is somewhat protected by the connecting member 18 so as to prevent against premature rupture.

In still another embodiment, the package 12 may include perforation lines, such as perforation line 88, located at the end of the subpackages. It should be understood that any such combination of perforation lines may be included on the package to facilitate opening. Further, horizontal and vertical perforation lines may cooperate together on any of the surfaces of the package.

The length of the perforation lines may also vary depending upon the particular application and the location of the perforation line. For instance, in one embodiment, the perforation line may only extend along a portion of the length of the package or of the width of the package. In one particular embodiment as shown in FIG. 9, one of the surfaces of the package can include a first vertical perforation line 84 offset from a second perforation line 84B. Further, the perforation lines 84A and 84B even together may not extend the full length of the package although, alternatively, they may overlap along the length of the package.

Referring to FIGS. 10A and 10B, still another embodiment of a package 12 made in accordance with the present disclosure is shown. Again, like reference numerals have been used to indicate the same or similar elements. In this embodiment, the package 12 includes a first subpackage 14 connected to a second subpackage 16 by a connecting member 18. In this particular embodiment, the second subpackage 16 is divided into subcompartments for containing the same or different products.

In the embodiment illustrated in FIGS. 10A and 10B, openings 22 and 24 are formed into the connecting member 18 in order to create a handle. In particular, in this embodiment, the openings 22 and 24 define curved slits. As shown, the curved slits 22 and 24 are separated by a band 90. As particularly shown in FIG. 10B, the band 90 forms a handle for carrying the package 12.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A packaged consumable product comprising:
an outer package comprising a first subpackage spaced from a second subpackage, the first subpackage being attached to the second subpackage by a connecting member, the connecting member having a width and being made from a material sufficient to permit the first subpackage to fold adjacent to the second subpackage; and
a first group of consumable products contained in the first subpackage and a second group of consumable products contained in the second subpackage; the first package and the second package being made from a material comprising a polymer film, a nonwoven material, or a coated paper; and
further comprising a handle that is integral with the connecting member.

2. A packaged consumable product as defined in claim 1, wherein the outer package is made from a film.

3. A packaged consumable product as defined in claim 1, wherein the outer package is made from a nonwoven material.

4. A packaged consumable product as defined in claim 1, wherein the outer package is made from a coated paper.

5. A packaged consumable product as defined in claim 1, wherein the first group of consumable products comprises diapers, tissue products, adult incontinence products, training pants, disposable swimming pants, or feminine hygiene products.

6. A packaged consumable product as defined in claim 1, wherein the first group of consumable products is different from the second group of consumable products.

7. A packaged consumable product as defined in claim 1, wherein the connecting member comprises a first opening spaced from a second opening, the first and second openings cooperating together to form the handle when the first subpackage is folded adjacent to the second subpackage.

8. A packaged consumable product as defined in claim 7, wherein the first opening and the second opening comprise slits, the slits being spaced apart to form a band that serves as the handle when the first subpackage is folded adjacent to the second subpackage.

9. A packaged consumable product as defined in claim 7, wherein the connecting member comprises a laminate including a foam material laminated to a film or fabric material, the first and second openings being formed into the laminate.

10. A packaged consumable product as defined in claim 9, wherein the film or fabric material laminated to the foam material comprises a nonwoven material.

11. A packaged consumable product as defined in claim 1, wherein the first subpackage is only connected to the second subpackage by the connecting member allowing the first and second subpackages to be draped over an adjacent structure.

12. A packaged consumable product as defined in claim 1, wherein the first subpackage and the second subpackage are each separated into subcompartments.

13. A packaged consumable product as defined in claim 12, wherein the consumable products comprise spirally wound tissue products, a column of spirally wound tissue products being contained in each of the subcompartments.

14. A packaged consumable product as defined in claim 12, wherein each of the subcompartments are separated by a perforation line.

15. A packaged consumable product as defined in claim 1, wherein the outer package comprises an exterior surface defining an inner surface portion and an outer surface portion, the inner surface portion being located between the first and second subpackages when the subpackages are placed adjacent to one another, the outer package further comprising a first perforation line located on the first subpackage and a second perforation line located on the second subpackage, the first and second perforation lines being located on the inner surface portion of the exterior surface of the package.

16. A packaged consumable product as defined in claim 1, wherein the outer package includes an exterior surface defining an inner surface portion and an outer surface portion, the inner surface portion being located between the first and second subpackages when the subpackages are placed adjacent to one another, the outer package further comprising at least one perforation line located on each of the subpackages, the perforation lines being located on the outer surface portion of the exterior surface for facilitating the opening of the package.

17. A packaged consumable product comprising:
an outer package comprising a first subpackage spaced from a second subpackage, the first subpackage being attached to the second subpackage by a connecting member, the connecting member having a width and being made from a material sufficient to permit the first subpackage to fold adjacent to the second subpackage; and
a first group of consumable products contained in the first subpackage and a second group of consumable products contained in the second subpackage;
wherein the first subpackage and the second subpackage each define a first end attached to the connecting member and a second and opposite end, a first panel being attached to the second end of the first subpackage and a second panel being attached to the second end of the second subpackage, the first panel defining a first opening and the second panel defining a second opening, and wherein the first opening on the first panel cooperates with the second opening on the second panel to form the handle which is integral with the first and second panel when the subpackages are folded adjacent to each other.

18. A packaged consumable product as defined in claim 17, further comprising an engaging device for connecting the first panel to the second panel in forming the handle when the first and second subpackages are folded adjacent to each other.

19. A package for holding consumable products comprising:
a first subpackage spaced from a second subpackage, the first subpackage being attached to the second subpackage by a connecting member, the connecting member having a width and being configured to attach the first subpackage to the second subpackage to permit the first subpackage to fold adjacent to the second subpackage, the first subpackage the second subpackage, and the connecting member being made from a material comprising a polymer film, a nonwoven material, or a coated paper; and
a handle integral with the connecting member.

20. A package as defined in claim 19, wherein the first subpackage and the second subpackage are divided into subcompartments.

21. A package as defined in claim 19, wherein the first subpackage has substantially the same volume as the second subpackage.

22. A package as defined in claim 21, wherein the connecting member comprises a laminate including a foam material laminated to a film or fabric material, the first and second openings being formed into the laminate.

23. A package as defined in claim 19, wherein the connecting member comprises a first opening spaced from a second opening, the first and second openings cooperating together to form the handle when the first subpackage is folded adjacent to the second subpackage.

24. A package as defined in claim 19, wherein the handle is integral with the connecting member.

25. A package as defined in claim 19, wherein the first subpackage is only connected to the second subpackage by the connecting member allowing the first and second subpackages to be draped over an adjacent structure.

* * * * *